United States Patent
Kennington

(10) Patent No.: US 8,800,542 B1
(45) Date of Patent: Aug. 12, 2014

(54) AUTOMATIC TEMPERATURE CONTROL DEVICE FOR SOLID FUEL FIRED FOOD COOKER

(76) Inventor: John Matthew Kennington, O'Fallon, MO (US)

(*) Notice: Subject to any disclaimer, the term of this patent is extended or adjusted under 35 U.S.C. 154(b) by 330 days.

(21) Appl. No.: 13/184,536

(22) Filed: Jul. 16, 2011

Related U.S. Application Data

(60) Provisional application No. 61/399,971, filed on Jul. 20, 2010.

(51) Int. Cl.
- A47J 27/00 (2006.01)
- F24B 15/00 (2006.01)
- A47J 37/07 (2006.01)

(52) U.S. Cl.
CPC .......... F24B 15/005 (2013.01); A47J 37/079 (2013.01); A47J 37/0754 (2013.01); A47J 37/0786 (2013.01)
USPC ........ 126/25 B; 126/25 R; 126/15 A; 126/29; 99/333; 99/329 R

(58) Field of Classification Search
CPC . A47J 37/0754; A47J 37/079; A47J 37/0786; F24B 15/005; F24B 1/187; F24B 1/185; F24B 1/19; F23N 2023/36; F23N 3033/04
USPC .......... 126/25 R, 25 B, 15 A, 29; 137/355.16, 137/377, 382.5; 269/41; 99/333, 329 R
See application file for complete search history.

(56) References Cited

U.S. PATENT DOCUMENTS

| | | | | |
|---|---|---|---|---|
| 2,950,669 A | * | 8/1960 | Terry | 99/421 H |
| 4,100,914 A | * | 7/1978 | Williams | 126/631 |
| 4,180,094 A | * | 12/1979 | Viragh | 137/362 |

(Continued)

OTHER PUBLICATIONS

Microstar Laboratories, Online Self-Tuning PID Controller [online], 2009 [retrieved on Jul. 11, 2013] Retrieved from Microstar Laboratories Control Applications and Techniques from Internet <URL: http://www.mstarlabs.com/control.html>.*

(Continued)

Primary Examiner — Kenneth Rinehart
Assistant Examiner — Sharla Magana
(74) Attorney, Agent, or Firm — Kevin L. Klug

(57) ABSTRACT

An automatic temperature control device for solid fuel fired food cooker fueled by wood, charcoal, or other solid fuels which is capable of operation with any type of cooker without utilization of different sized blowers and conserves solid fuel usage. The present invention serves to regulate cooking temperature by controlling or optimizing the amount of combustion air reaching the fuel. The present invention also allows an outdoor barbecue grill or smoker of any reasonable size to be retrofitted with the invention in order to allow a chef to cook foods at stable and precise temperatures. The core components of the invention are an air blower to provide combustion air to the burning fuel, an electronic controller to control the amount of air delivered by the air blower via a unique algorithm embedded within the electronic controller, a temperature sensor to sense the temperature inside of the cooker in the vicinity of the cooking food and provide feedback to the electronic controller, and an air tube and air manifold to get or direct the combustion air from the air blower inside the blower box to the burning fuel inside the cooker. Alternative embodiments utilize an automatic damper connected with said electronic controller whereby convection air currents may be precisely controlled.

17 Claims, 12 Drawing Sheets

(56) References Cited

U.S. PATENT DOCUMENTS

| | | | |
|---|---|---|---|
| 5,441,344 A * | 8/1995 | Cook, III | 374/141 |
| 6,615,820 B1 * | 9/2003 | Ferreira et al. | 126/25 B |
| 7,516,692 B2 | 4/2009 | Pirkle et al. | |
| 8,105,207 B1 * | 1/2012 | Lannon et al. | 482/8 |
| 8,297,271 B2 * | 10/2012 | Cedar et al. | 126/25 B |
| 2003/0015188 A1 * | 1/2003 | Harbin | 126/25 R |
| 2006/0266229 A1 * | 11/2006 | Ribich | 99/486 |
| 2007/0119875 A1 * | 5/2007 | Ehret et al. | 222/386.5 |
| 2007/0131216 A1 * | 6/2007 | Le Breis | 126/25 R |
| 2008/0168977 A1 * | 7/2008 | Daud | 126/25 B |
| 2009/0266903 A1 * | 10/2009 | Fitzgerald et al. | 236/49.3 |
| 2010/0275897 A1 * | 11/2010 | May | 126/42 |

OTHER PUBLICATIONS

Press, Barry, Geek House : 10 Hardware Hacking Projects for Around Home, Chapter 8: Automated BBQ Temperature Control (pp. 159-183) [online] 2005 [retrieved on Jul. 11, 2013] Retrieved from Parallax from the Internet <URL: http://www.parallax.com/dl/docs/article/geekhousech8.pdf>.*

Microstar Laboratories, Online Self-Tuning PID Controller [online], Feb. 20, 2008 [retrieved on Dec. 4, 2013] Retrieved from Microstar Laboratories Control Applications and Techniques from Internet <URL: http://web.archive.org/web/20080220025425/http://www.mstarlabs.com/control/self-tuning-pid.html>.*

W. Stephen Woodward, Title: Take Back Half: A Novel IntegratingTemperature-Control Algorithm, Electronic Design, Published Dec. 4, 2000 Penton Media, published online at: http://electronicdesign.com/article/analog-and-mixed-signal/take-back-half-a-novel-integrating-temperature-con.

W. Stephen Woodward, Title: Temperature Controller Has "Take-Back-Half" Convergence Algorithm, EDN, Published Sep. 15, 2005 UBM Electronics, published online at: http://www.edn.com/article/471081-Temperature controller has take back half convergence algorithm.php.

John Moyer, Title: Automatic Temperature Controller: Designing a Data Logger for a Slow Cooker, Atmel Applications Journal, www.atmel.com, pp. 23-27, Reprinted with permission of Circuit Cellar, Issue 154, May 2003.

www.bbqguru.com/categories/Build-a-BBQ-Guru-System-Here/—barbeque temperature controllers—Models—CyberQ, DigiQ, NanoQ, and ProCom.

www.rocksbarbque.com—barbeque temperature controllers—Model—Stoker.

http://www.auberins.com/index.php?main_page=index&cPath=14_27—barbeque temperature controllers—Models—SYL-1613, BL series snap on blowers.

* cited by examiner

AUTOMATIC TEMPERATURE CONTROL DEVICE FOR SOLID FUEL FIRED FOOD COOKER This application claims priority of U.S. Provisional Patent Application No. 61/399,971, filed Jul. 20, 2010, entitled Automatic Temperature Control Device for Solid Fuel Fired Food Cooker.

BACKGROUND OF THE INVENTION

The art of the present invention relates to temperature controllers for fuel fired cooking equipment in general and more particularly to an apparatus and method of use which automatically controls the air feeding the fuel (typically charcoal or wood) of a barbeque grill, smoker, or cooker and which is easily installed upon commercially available equipment without modification.

Currently there are a number or plurality of prior art solutions for automatically controlling the cooking temperature of a solid fueled food cooker. These inventions or prior art attempts to provide a solution that is easy to use, fail to meet the needs of the marketplace because they are difficult to configure and to connect to the cooker and because of their increased cost. Primarily, this is because they are composed of independent components that must be connected together during installation. Specifically, these prior art systems are composed of physically separated components that must be attached and/or connected by the user. These components include the air blower assembly, the cooker adapter, the electronic controller, and the cooking temperature probe. In using said prior art solutions, the user attaches the cooker adapter directly to the cooker with tools such as wrenches, screwdrivers, or other specialty tools. The prior art air blower assembly, consisting of an air blower and a housing, is then attached to the cooker adapter, again typically using tools. The air blower assembly power cable is then connected to the electronic controller box that typically rests on the ground or on a table. The cooking temperature sensor cable is then plugged into the electronic controller box and the cable is routed into the cooker under the cooker's lid or through a door, often causing physical abrasion, pinching, and mechanical stresses on the wires inside the cable. In addition, these systems require the user to select both a cooker adapter and an air blower assembly that is sized specifically for a single cooker size. The prior art user-chosen air blower (which is commercially available) is not modulated with a variable voltage to control its speed between full off and full on, thus a specific air blower size is required for a specific cooker size. When the user moves the prior art controller solution or system to another cooker, it is commonly required that the user purchase both a different size air blower assembly and a different cooker adapter. Additionally, no means or apparatus is provided to hang the electronic controller from handles present on the cooker nor is an internal battery pack offered for these solutions. Also, the increased complexity of these prior art solutions unnecessarily increases both the user's time required to attach and to connect them to a cooker as well as the system cost.

The present invention provides a self contained blower and blower controller which attaches with a cooker, grill, or smoker via a flexible hose, measures the ambient air temperature within the cooker, and adjusts the air flow into the cooker via a unique algorithm, all in a compact device which may be easily hung onto the cooker. The present art may be installed upon commercially available cookers without the requirement of specialty tools. The unique algorithmic control allows for a minimal use of fuel (typically charcoal or wood) to provide optimum cooking thereby minimizing energy consumption and also adaptively learns the thermal mass parameters of the cooker in order to meet the desired temperature quickly with a minimum of overshoot.

The present art provides stable and precise temperature control of a wood or charcoal fired barbecue grill or smoker. It also easily attaches to a cooker already in the possession of the user without modification. The preferred embodiment present art apparatus is a single assembly which attaches to the user's cooker without the use of any tools. The present art is also simpler, easily configured, and of a lower cost than other solutions in the marketplace which allows owners of low cost food cookers to retrofit their cooker with automatic temperature control.

Accordingly, it is an object of the present invention to provide an automatic temperature control device for solid fuel fired food cooker representing an apparatus and method of use which provides the necessary air for combustion to the solid fuel in a self contained compact unit which may be quickly adapted to any cooker without the requirement of specialty tools and that does not suffer from any of the problems or deficiencies associated with prior art solutions.

Another object of the present invention is to provide an automatic temperature control device and method of use for barbecue grills and smokers that is easily installed on the user's grill or smoker in under one minute without the use of any tools, is simple to understand, does not require the user to select a specific separate air blower, and does not require the user to select a specific cooker adapter to mount the air blower to the cooker.

Another object of the present invention is to provide an automatic temperature control device for solid fuel fired food cooker representing an apparatus and method of use which adaptively senses or measures the thermal parameters of the cooker and adjusts the airflow of combustion to rapidly and precisely meet the set temperature with a minimum of overshoot.

A further object of the present invention is to provide an automatic temperature control device for solid fuel fired food cooker representing an apparatus and method of use which utilizes a blower time proportioning algorithm and/or a blower speed control algorithm in conjunction with a take back half proportional integral derivative (PID) algorithm in order to optimally meet the desired cooking environment temperature.

A yet further object of the present invention is to provide an automatic temperature control device for solid fuel fired food cooker representing an apparatus and method of use which utilizes an automatic or manual damper system to allow control of naturally occurring convection currents.

A still further object of the present invention to provide an automatic temperature control device and method of use for barbecue grills and smokers that senses the combustion air volume requirements of the cooker and adjusts the air blower speed accordingly, thereby allowing a larger air blower to satisfy the combustion air requirements of both large and small cookers alike.

SUMMARY OF THE INVENTION

To accomplish the foregoing and other objects of this invention, there is provided an automatic temperature control device for solid fuel fired food cooker representing an apparatus and method of use having a micro-controller based electronic controller and blower in a single blower box housing, an air tube, an air manifold, a temperature sensor connected with said blower box via a cable, and a power supply.

For an alternative embodiment, a damper is attached with an inlet of said blower box and automatically or manually controls the natural convection currents. The controller utilizes a take back half proportional integral derivative (PID) algorithm to control the blower speed, the blower on time, and the damper opening or closing.

The present invention advantageously fills the aforementioned deficiencies by providing an automatic temperature control device for a solid fuel fired food cooker which provides precise and stable temperature control for barbecue grills and smokers in an easy to use and low cost solution.

The present art represents an automatic temperature controller for solid fuel fired cookers, comprising a blower box, an air tube, an air manifold, a temperature sensor, a temperature sensor cable, and a power supply. In an alternative embodiment, a damper in the form of a rotary vane or other vent closing apparatus is attached with said blower box to allow more precise control of the air flow onto the solid fuel. The blower box contains an air blower and an electronic controller that both controls operation of the air blower and interprets the electrical signal from the temperature sensor. The air tube delivers air from the blower box to the air manifold. The air manifold attaches to the food cooker to inject combustion air delivered by the air tube into the food cooker. The electronic controller uses the measured cooking temperature to adjust the instantaneous and average air which is forced into the air tube in order to adjust the temperature of the fire, all by modulating the voltage to the air blower. In a preferred embodiment, the electronic controller has a rotary control that protrudes though the blower box's enclosure. A knob with a pointer is attached to the protruding shaft of the rotary control. The desired cooking temperature is set by turning the knob's pointer to point at or in between a temperature number printed on the graphic overlay that is adhered to the face of the blower box. For the preferred embodiment, the electronic controller also provides a light emitting diode (LED) (or other light or visual indication) for visual feedback indicating if the cooking temperature is near the selected temperature, too cold, slightly hot, very hot, or if the controller has detected an error condition. For safety, the blower box has an air intake grate that prevents the user's fingers from touching moving parts inside.

The blower box connects to the temperature sensor via the temperature sensor cable. For an alternative embodiment of the present art, the temperature sensor cable is routed through the air tube and the air manifold into the food cooker. During utilization, the temperature sensor clip is preferably attached with the cooker in the vicinity of the food cooking area. The power supply connects to the blower box to provide electrical power. The flow of combustion air to the burning fuel is delivered by the blower box through the air tube and air manifold into the cooker and is modulated by the blower box to control the rate of fuel burn and thus the average temperature near the food area of the cooker. For the preferred embodiment, the blower box has a hanger that allows it to hang from the food cooker's handle or other extending elements of the cooker.

Alternative embodiments of the present art invention may also have one or more of the following: (1) standoffs attached to the back of the blower box to hold the device away from the cooker, (2) a magnetic attachment mechanism to mount the blower box to the cooker, (3) a water resistant version of the blower box; (4) a heat resistant version of the blower box, (5) a variable speed capability to automatically control the speed of the air blower to allow a more powerful air blower to be used and its speed adjusted automatically when the electronic controller senses that more or less air blower capacity is needed, (6) a temperature sensor inside the blower box to shut down the airflow when the blower box is too close to a surface that is too hot, (7) detection of excessive air blower motor current flow and subsequent shutdown of air flow, (8) a manual, passive, or microcontroller controlled active damper to prevent combustion air from being drawn through the system with the air blower off, (9) a character or graphic display for presentation of cooking variables and settings of cooking parameters, (10) discrete or membrane key switches for selection of cooking options and manipulation of cooking parameters, (11) a touch screen for selection of cooking options and manipulation of cooking parameters, (12) multiple discrete visual indicators (LEDs or other visual elements) for presentation of information, (13) an audible alarm for annunciation of alarm conditions, (14) a rigid or flexible air tube of any length and of any suitable material, (15) a wing bolt and toggle nut attachment method for attachment of the air manifold without the need for tools, (16) a magnetic attachment method for attachment of the air manifold without the need for tools, (17) a temperature sensor cable that can be detached at the air manifold to permit removal or replacement of the temperature sensor and its portion of the split temperature sensor cable, (18) an alternate connection point on the blower box for the temperature sensor cable, (19) a spring clip or hanger on the temperature sensor to secure it in the desired location, (20) an internal or external rechargeable or disposable battery pack to be used in addition to or in lieu of an external power source, and (21) an air manifold consisting of a curved metal plate with a hole designed to directly retain the air tube by surrounding the air tube's corrugations.

The present invention is unique when compared with other known devices and solutions as the present invention provides: (1) a single, interconnected, ready-to-use assembly right out of the box, (2) a solution that is simpler to understand because it does not require choosing a specific air blower size nor a specific cooker adapter for a specific cooker, (3) a tool free installation, (4) a much faster installation that can be completed in under one minute, (5) a system that attaches with a single wing bolt and toggle nut using only finger pressure, (6) the capability to hang the blower box from a cooker's handle, (7) lower cost through reduced complexity and fewer components, (8) lower cost through the use of a single housing for both the electronic controller and the air blower, (9) lower cost when moving the present invention to a different size cooker because a different size air blower does not need to be purchased, (10) easier movement of the present invention between different cookers as there is no need to change the air blower or the cooking adapter, and (11) adaptive control of the air flow via blower and damper control and a unique implementation of a specialized algorithm within the electronic temperature controller.

The present invention is unique in that it is structurally different from other known devices or solutions. More specifically, the present invention has structurally unique elements which include but are not limited to: (1) encasement of the electronic controller and air blower in a single housing, (2) the electronic controller is pre-wired or factory wired to the air blower, (3) the combustion air delivered into the cooker via the air tube/air manifold combination, (4) attachment of the air tube to the air manifold, (5) a large capacity air blower utilized for all applications and a plurality of cooker sizes, (6) the air blower electrical power being modulated with a variable duty cycle pulse width modulation (PWM) signal as well as time and damper control; (7) the air blower's speed being controlled continuously anywhere between full-off and full-on, (8) the air blower's speed being chosen by the electronic controller based on the rate of temperature rise ($dT/dt$) in the cooker, (9) the inclusion of a hanging mechanism to hang the blower box from the cooker's handle or other extremities, (10) the air manifold mounting hardware consisting of magnets or a single wing bolt with toggle nut, (11) the integrated design allows the system to arrive pre-assembled or factory assembled, and (12) the integration of a rechargeable battery pack to be used in addition to or in lieu of external power.

The art of the present invention may be manufactured from a variety of materials provided that said materials are able to withstand the heat and stresses applied during operation of the apparatus. Said materials include but are not limited to various metals and their alloys, woods, rubbers, plastics, or composites. For the preferred embodiment, the air tube is an ethylene propylene diene monomer (EPDM) rubber, the manifold is of a steel metal, and the temperature sensor is a resistive thermal device or resistance temperature detector (RTD), and the automatic temperature controller is based upon a PIC 16F616 micro-controller with associated interface circuitry.

BRIEF DESCRIPTION OF THE DRAWINGS

Numerous other objects, features and advantages of the invention should now become apparent upon a reading of the detailed description taken in conjunction with the accompanying drawings, in which.

DETAILED DESCRIPTION

Figure 1:
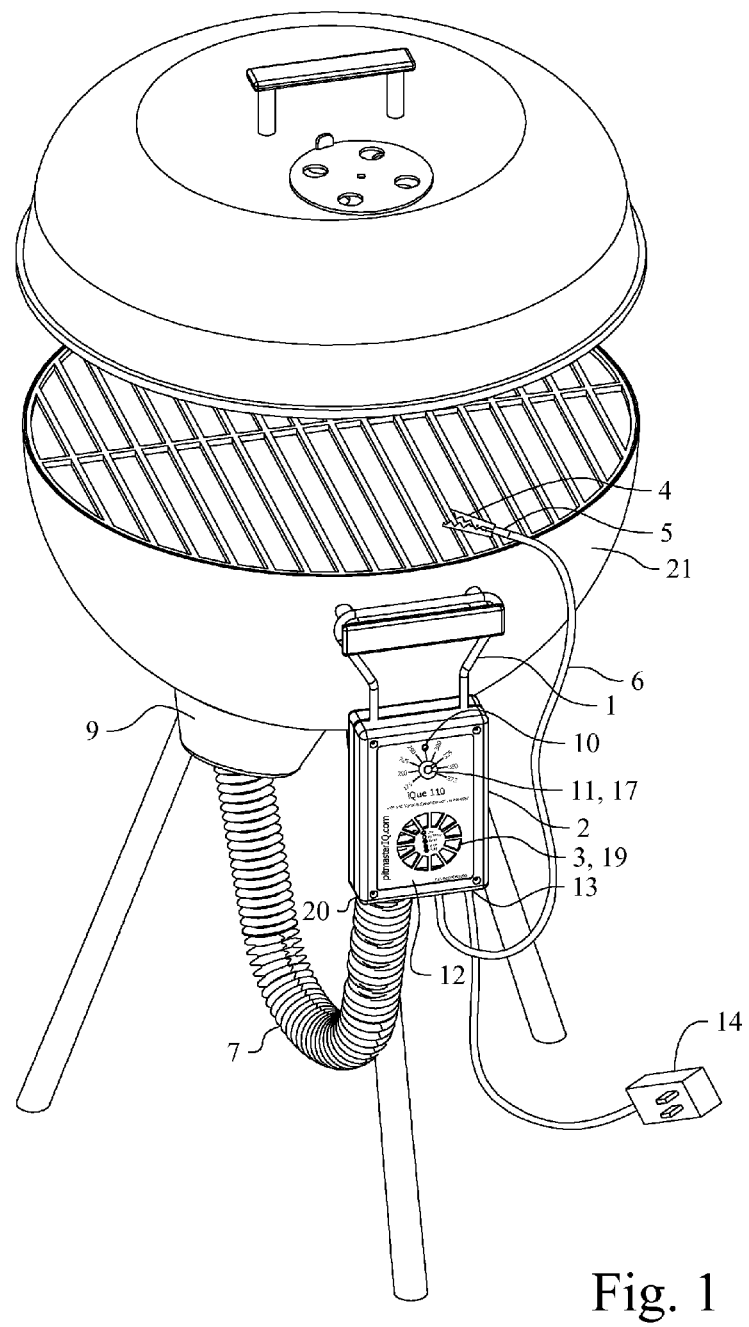
FIG. 1 is a front perspective view of an automatic temperature control device for solid fuel fired food cooker hung with a kettle type cooker.
Figure 2:
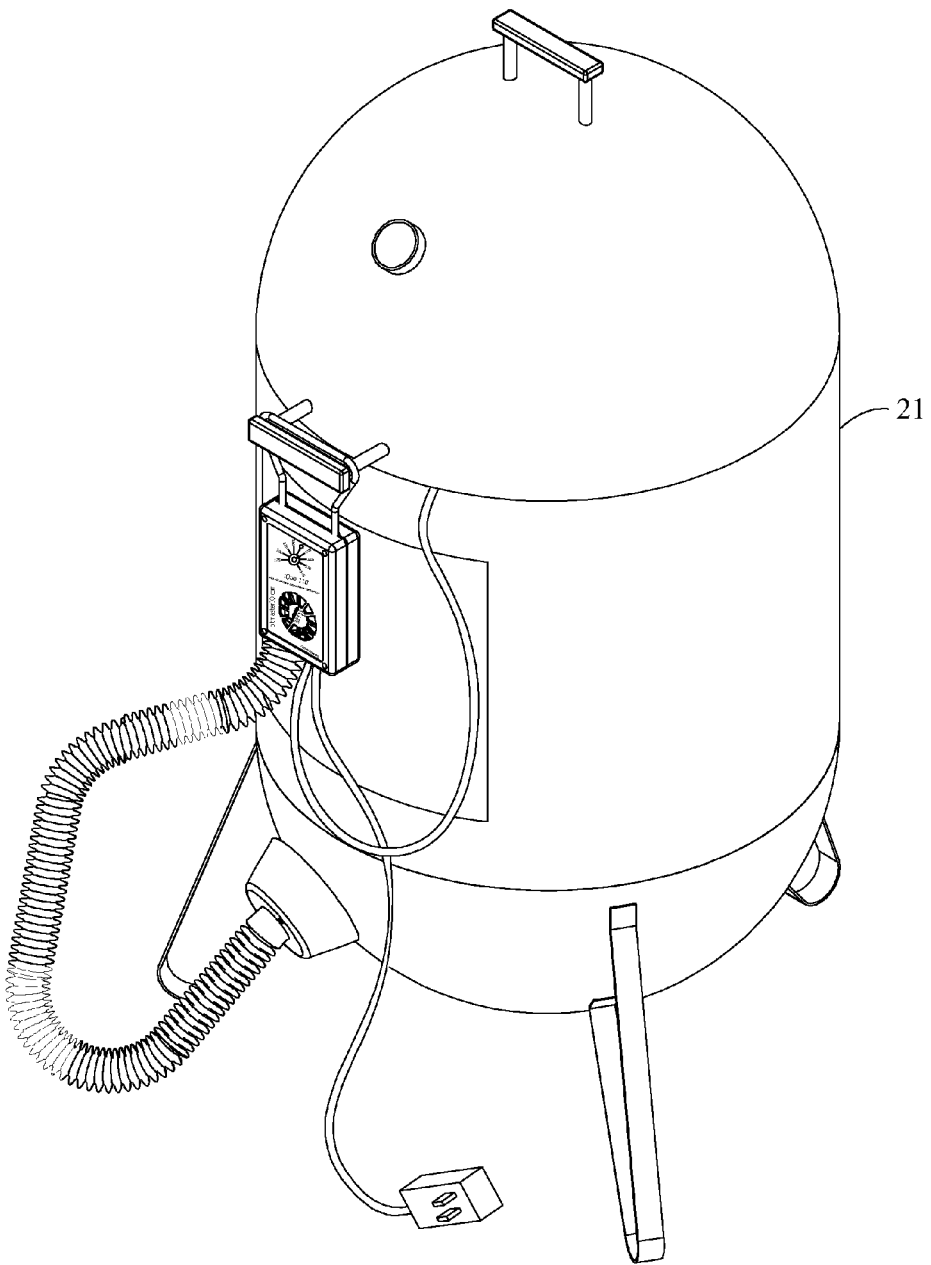
FIG. 2 is a front perspective view of an automatic temperature control device for solid fuel fired food cooker hung with a bullet type cooker.

The preferred embodiment of the present art automatic temperature control device for solid fuel fired food cooker 30 comprises a blower box 2 having an electronic controller 18 within an inside, an air manifold 9 outside of said blower box 2, an air tube 7 connecting the blower box 2 to the air manifold 9, a cooking temperature sensor 5, a cooking temperature sensor cable 6, a cooking temperature sensor retaining clip 4, and a power supply 14. Alternative embodiments may utilize a wireless remote control module and one, two, or more food temperature sensing probes.

The blower box houses an air blower 19 that draws or ingests atmospheric air through a finger safe grate 3 and forces it into the air tube 7. The air tube 7 passes into or onto the blower box housing and connects directly or indirectly with the air blower's discharge port 20. The air tube 7, which is preferably made of rubber and has corrugations to keep it from kinking when bent tightly, is preferably retained by the blower box 2 housing by gripping it between the first and second corrugations. Alternative embodiments may utilize a plurality of air tube 7 retention techniques including but not limited to nipples, adhesives, clamps, or integral molding. Alternative embodiments may also utilize a plurality of forms of air tubes 7, including but not limited to flexible hoses, pipes, or heat resistant molded assemblies.

For the preferred embodiment, the air blower 19 receives its electrical power from the electronic controller 18 also housed in the blower box 2. The electronic controller 18 varies the electrical power to the air blower 19 in order to control the instantaneous and average amount of air forced into the air tube 7. For the preferred embodiment, the electrical power to the air blower 19 is controlled by pulse width modulating (PWM) its voltage between two direct current (DC) voltages. The modulation duty cycle varies continuously between 0%, which is completely off, and 100%, which is completely on, provided the blower 19 utilized will support a near 0% duty cycle. The modulation duty cycle is chosen by software algorithms in the electronic controller 18 with the goal of keeping the cooking temperature at the temperature set point and assuring that the air blower 19 has a sufficient duty cycle to begin operation. If the blower 19 will only support a duty cycle greater than near 0%, the minimum supported blower 19 duty cycle is utilized as the minimum blower 19 drive value.

The electronic controller 18 connects to the cooking temperature sensor 5 via the temperature sensor cable 6 in order to measure the cooking temperature. The electronic controller 18 uses the measured cooking temperature to adjust the instantaneous and average air amount or volume forced into the air tube 7 in order to adjust the temperature of the burning solid fuel by modulating the voltage to the air blower 19. The preferred embodiment of the electronic controller 18 has a status LED 10 (or other indicator light) and a rotary temperature selection knob 11 for temperature control. For the preferred embodiment, the LED 10 is visible through the blower box's enclosure, is bicolored red and green (based upon bias direction), and represents the following:

| LED COLOR | MEANING |
| --- | --- |
| Flashing Green | Actual temp 10° F. or more below temperature set point |
| Solid Green | Actual temp within 10° F. of set temp (i.e. close to said temperature set point) |
| Alternating Red/Green | Multiple meanings: 1) lid off delay in effect 2) blower box overheated 3) temperature probe failure (short or open circuit) |

| LED COLOR | MEANING |
|---|---|
| Solid Red | Actual temp 10° F. or more over set temp |
| Flashing Red | Actual temp 50° F. or more over temperature set point |

Alternative embodiments may utilize various types of user interfaces, including but not limited to, the most sophisticated of which consists of a graphic liquid crystal display (LCD), four membrane key switches, and five light emitting diodes (LEDs) which are visible through the blower box's enclosure. Said membrane key switches are integrated into the graphic overlay 12 that is adhered to the face of the blower box 2. Numerous cooking variables and parameters, the most obvious of which are the desired and actual cooking temperatures, are viewable or modifiable through this alternative user interface. The LEDs convey system status including: too cool; too warm; at desired temperature; error condition present; and battery charging status. Further alternative embodiments allow the electronic controller 18 to also connect to two food temperature probes through jacks mounted to the blower box 2 housing. The food temperature probes are used to view the food temperature through the user interface and also to automatically adjust the cooking temperature at preset food temperatures.

For the preferred embodiment, the air manifold 9 attaches to the user's cooker 21 at points on the cooker 21 designed for the ingestion of combustion air. For the preferred embodiment, the air manifold 9 is a cup shaped element having an exiting hose barb 8 or equivalent member to attach the air tube 7. Alternative embodiments may utilize manifolds 9 which are bowl, rectangular, or plate shaped or simply represent a ball valve, pipe, or hose barb type element which exits or is attached with the cooker 21. For the preferred embodiment, the method of attachment consists of a threaded bolt 15 with a fixed wing head (wing bolt) 15 on the end of the bolt 15 that is visible on the outside of the air manifold 9. The end of the wing bolt 15 is visible from the inside of the air manifold 9 and is screwed or threaded into a folding toggle nut 16. During installation, the air manifold 9 is mounted to the user's cooker 21 by folding the toggle nut 16, pushing it though an existing air intake hole on the cooker 21, allowing the toggle nut 16 to unfold, and then turning the wing bolt 15 with finger pressure until the air manifold's 9 edges are held tightly against the cooker 21. The closed end of the air manifold 9, i.e., the end that does not attach to the cooker, preferably has a hose barb 8 mounted to it which is designed to retain the air tube 7. Alternative embodiments may mount said manifold 9 in a plurality of ways, including but not limited to adhesives, screws, pins, magnets, wire, or hooks.

For the preferred embodiment, the air tube 7 is a rubber corrugated tube that connects the blower box 2 to the air manifold 9. Its primary purpose is to channel the air forced into it by the air blower 19 into the cooker 21 through the air manifold 9. It is corrugated in an annular fashion to both allow mechanical retention by the blower box 2 enclosure and to prevent it from kinking as it is bent. An alternative embodiment also utilizes the air tube 7 in order to pass the temperature sensor cable 6 from the inside of the blower box 2 through the air manifold 9 and into the cooker 21. For said alternative embodiment, the cooking temperature sensor cable 6 is split in the interior of the air manifold 9 to permit attachment of mating electrical connectors. This allows the portion of the temperature sensor cable 6 that enters the cooker, that portion with the temperature sensor 5 attached to it, to be replaced as necessary or to be removed for convenience. The preferred embodiment simply places the cooking temperature sensor 5 and cable 6 between a lid and body of the cooker 21.

For the preferred embodiment, the portion of the temperature sensor cable 6 that enters the cooker 21 is designed to sustain the heat of the fire from a distance of three inches without damage. The cable 6 terminates into a metal housing that contains an electrical temperature sensing device or cooking temperature sensor 5, preferably an RTD, although alternative embodiments may utilize thermocouples, thermistors, or other semiconductor type sensors. The metal housing is attached to a spring retaining clip 4 that allows it to be attached where the user desires inside the cooker 21. The cooking temperature sensor 5 is represented on the schematics by the feed at connector J1, lines 5 & 6 and represents the feedback signal for the PIC16F616.

For the preferred embodiment, the power supply 14 attaches to the blower box 2 with a jack 13 connected to the blower box's 2 housing. The power supply 14 supplies the electricity needed to run the present invention 30 while connected to an external power source. Additionally for alternative embodiments, the power supply 14 recharges a battery pack inside the blower box 2. The battery pack powers the present invention 30 when it is desired to operate without an external power source or when the external power source is temporally interrupted.

An alternative embodiment of the electronic controller 18, inside the blower box 2, contains a wireless two-way communication radio capability designed to communicate with a remote radio module. The remote radio module is designed to both provide two-way communications with the blower box 2 and to provide communications with a computer. A computer program allows the user to interact with and control the system from their computer or from other computers connected to said computer through any network means.

In operation, the user connects the automatic temperature control device for solid fuel fired food cooker 30 system to their solid fuel cooker 21, typically burning charcoal and/or wood, as described. The user next starts a fire burning in the cooker 21, places the food to be cooked on the cooking grate, and then places the cooking temperature sensor 5 in or at the vicinity of the food to be cooked. For an alternative embodiment, the user then places one or two food temperature probes in the food being cooked. The cooker 21 is then closed and the desired cooking and food temperatures are programmed into the electronic controller 18 via the user interface. The electronic controller 18 operates the air blower 19 as necessary to maintain the desired cooking temperature up to the point where the desired food temperature is achieved. Cooking temperature is increased by forcing more air into the air tube 7 through increasing the electrical duty cycle to the air blower 19 and reduced by reducing the electrical duty cycle to the air blower 19. When the desired food temperature is reached, the cooking temperature is automatically adjusted to a programmed level, typically lower to hold the food at a desired temperature without increasing it further.

The preferred embodiment of the electronic controller 18 has a rotary control 17 that protrudes though the blower box's 2 enclosure. A knob 11 with a pointer is attached to the protruding shaft of the rotary control 17. The desired cooking temperature is set by turning the knob's pointer 11 to point at or in between a temperature number printed on the graphic overlay 12 that is adhered to the face of the blower box 2. The rotary control 17 is represented by the potentiometer R8 on the schematic and the output of said potentiometer (which feeds the PIC16F616) represents the setpoint input for the PID control system. The electronic controller 18 also provides a light emitting diode (LED) 10 (or other visual indication) for visual feedback indicating if the cooking temperature is near the selected temperature, too cold, slightly hot, very hot, or if the controller 18 has detected an error condition as afore described.

Figure 3:
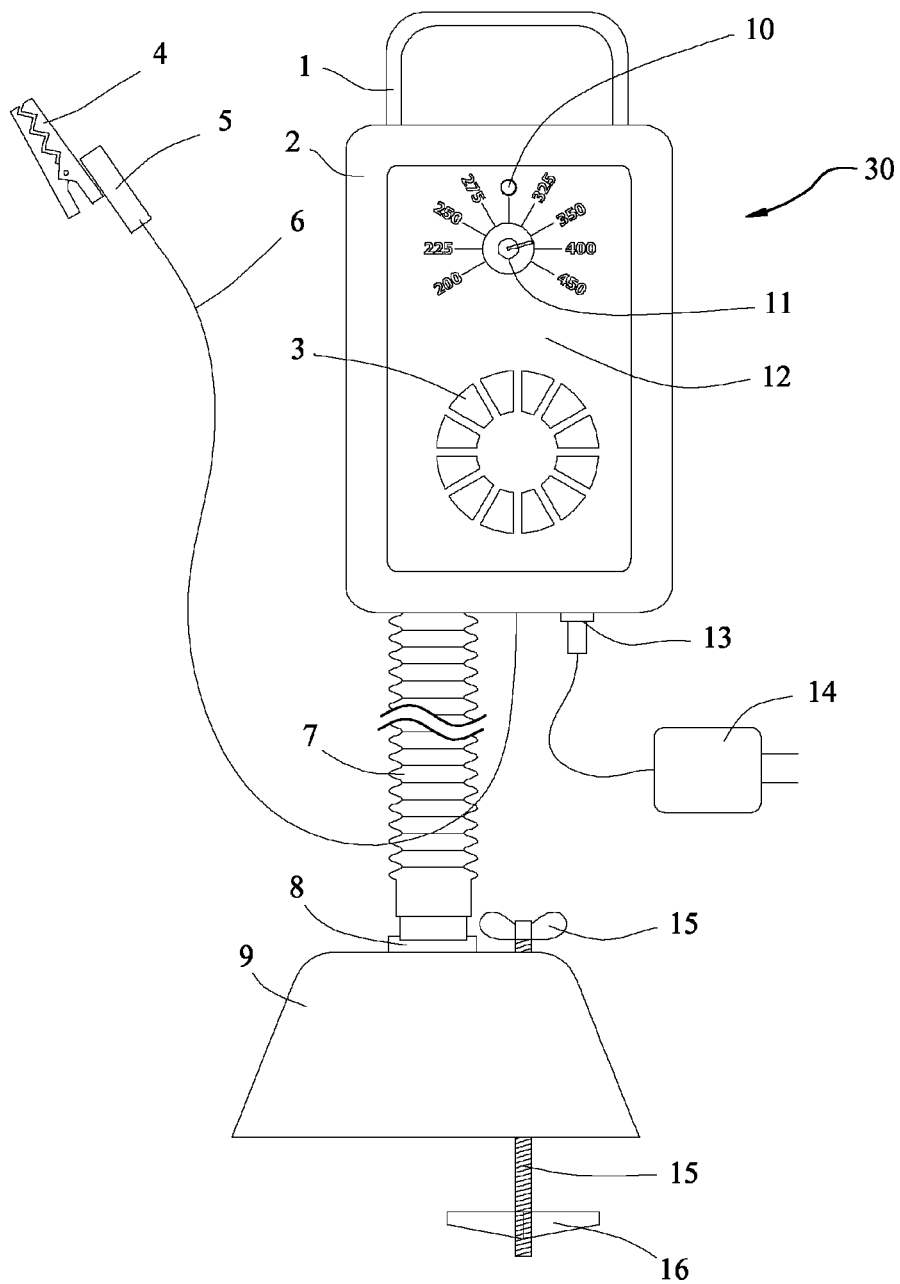
FIG. 3 shows a front plan diagrammatic view of the overall automatic temperature control device not attached with a cooker.

Referring to the Figures, FIG. 3 shows a front view of the overall device. It is shown how the handle 1 attaches to the blower box 2, how the air tube 7 connects to the blower box 2, and how the air manifold 9 connects to the air tube 7 via the hose barb 8. Also shown is the cooking temperature sensor cable 6 and how it connects to the temperature sensor 5, how it is routed through the air tube 7 and air manifold 9 for an alternative embodiment, and how the temperature sensor 5 connects to the temperature sensor spring clip 4. Shown as well are the finger-safe grate 3, the graphic overlay 12, and the most basic of the electronic controller configurations consisting of a status LED 10 and a rotary temperature selection knob 11.

Figure 4:
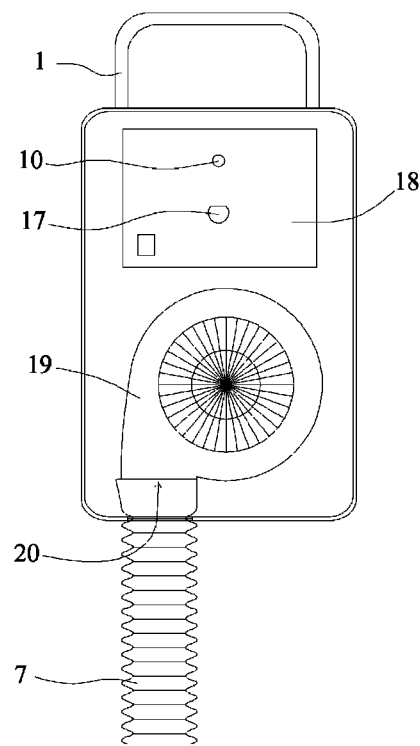
FIG. 4 shows a front plan diagrammatic view of the blower box with the top cover removed allowing the air blower and electronic controller to be seen.

FIG. 4 shows the blower box 2 with the top cover of the blower box 2 housing removed. Visible inside are the air blower 19, the electronic controller 18, and, for the alternative embodiment, the routing of the cooking temperature sensor cable 6 is out of the air tube 7 and to the electronic controller 18. Also shown is how the enclosure is used to provide a method of securely holding the air tube 7 in place by surrounding the air tube 7 lesser diameter between its annular corrugations.

Figure 5:
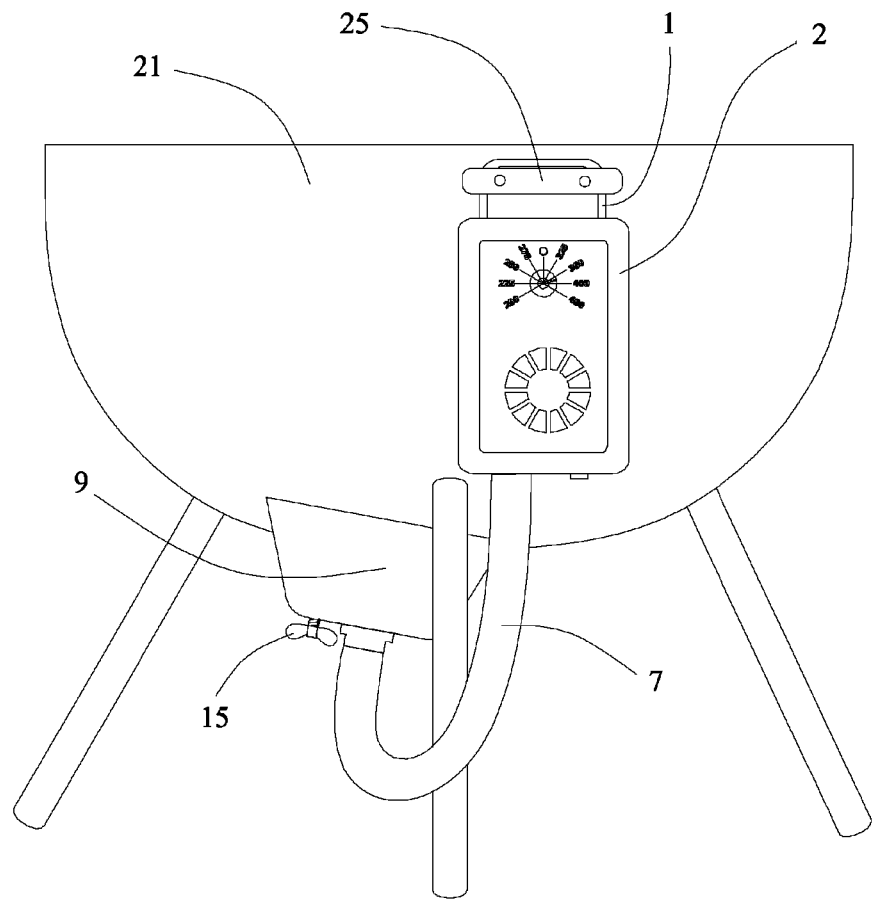
FIG. 5 shows a front plan diagrammatic view of a typical installation of the automatic temperature control device on a kettle style cooker.

FIG. 5 shows the attachment of the device to a typical kettle style grill 21. For an alternative embodiment and not explicitly shown, the cooking temperature sensor 5 and cable 6 are passed through an air hole in the bottom of the cooker 21. The toggle nut 16 is folded and passed through an air hole, and the wing bolt 15 is turned hand tight until the air manifold 9 is held securely against the cooker 21. The blower box's handle 1 is then placed over the cooker's handle 25. Preferably said handle 1 is of a flexible inverted "U" shaped form connected with a portion of the blower box 2 whereby it may be placed onto or around a portion or extension of the cooker 21.

The present art algorithmic control of airflow is based upon controlling the speed of the blower 19 and the amount of time said blower 19 is turned on within a fixed time window. As relating to this specification, varying the blower 19 speed or blower speed control (BSC), and controlling the time the blower 19 is on vs. the time the blower 19 is off is the blower time proportioning (BTP). The combination of BSC and BTP allows the average airflow from the blower 19 to be adjusted between 0% and 100%. For the preferred embodiment, a combination of BSC and BTP work in conjunction to produce the desired cooking temperature with a minimum of solid fuel usage.

Control of the average airflow from the blower 19 between 0% and 100% maximizes the ability of the control system (i.e. incorporated into the electronic controller 18) to regulate the temperature within the cooker 21. Control of the speed of the blower 19 also allows a continuous airflow through the cooker 21 which allows the instantaneous and average airflow to remain the same. As understood within the arts, it is not possible to continuously adjust the speed of all blowers 19 from 0% to 100%. For some blowers 19, it is only possible to continuously adjust the speed from some midpoint speed or flow to a full speed or flow while others allow only full on or full off speeds or flows. For the preferred embodiment, the speed or flow of the blower 19 can be reliably adjusted from 50% to 100% whereby the present art algorithmic control utilizes a combination of BSC/BTP control. Alternative embodiments of the present art may utilize a full BSC control algorithm, provided the blower 19 supports a full 0% to 100% control. This is especially true for a four terminal blower 19.

For the preferred embodiment, during low cooker 21 air demands, the blower 19 is operated at its minimum allowed speed via pulse width modulation (PWM) of the blower 19 input drive potential at the blower 19 input terminals. For enablement purposes only and by no means a limitation, as seen in the schematic Figures, this is accomplished by gate modulation of the N-channel enhancement mode MOSFET labeled as Q4B by the electronic controller 18 via an output port on the PIC 16F616 micro-controller. Blower 19 speeds below the minimum allowed will result in erratic operation unless the blower 19 allows speed control for a near zero duty cycle drive potential. For the preferred embodiment, during a period of low air demand, the average airflow is controlled using BTP. For BTP, the average airflow is controlled by controlling the amount of time the blower 19 is operated in a fixed time window. For the preferred embodiment, the fixed time window is approximately 20 seconds but may comprise a plurality of time window sizes in alternative embodiments. For the preferred embodiment and by way of example only and not limitation, for a very low air demand, the blower 19 may be operate for 5 seconds out of the 20 seconds possible which provides a remnant off time of 15 seconds. Also for the preferred embodiment and by way of example only and not limitation, if slightly more airflow is required in order to regulate temperature, the blower 19 may be operated for 18 seconds out of the possible 20 with 2 seconds off. Again, during the BTP period, the blower 19 is operated at the minimum speed or flow allowed for the specific blower 19 utilized.

For the preferred embodiment, when the on time for the blower 19 increases to 20 seconds, meaning it is continuously on, and still more air is required to regulate temperature, then the blower 19 speed or air flow is increased utilizing BSC. In this mode, the blower 19 runs continuously and its speed is increased or decreased between 50% and 100% in an attempt to keep the cooking temperature stable. Again for the preferred embodiment with a blower 19 that is incapable of operating below a 50% speed or flow, when operating in BSC with the blower 19 speed dropping and reaching the 50% speed point, the control algorithm switches back to BTP.

For the preferred embodiment, the blower 19 speed or flow is controlled by adjusting the average voltage presented to its power terminals. As afore described, the system DC voltage is pulse width modulated (PWM) to control the average voltage as seen by the blower 19 power terminals. For the preferred embodiment, the PWM frequency is 20 kHz, and the duty cycle is varied between 50% and 100% with alternative embodiments utilizing PWM frequencies of any desired frequency capable of supporting PWM for the blower 19.

An alternative embodiment of the present art utilizes a blower 19 having four terminals. In addition to the blower 19 power input terminals, a third terminal is provided to command the electronics contained within the blower 19 to operate the blower 19 at a specific speed. The third terminal is driven with the PWM signal and controls commutation of the blower 19. Further alternative embodiments may utilize a third terminal speed control which relies upon a direct current value or digital input value. For the alternative embodiment, a fourth terminal is commonly provided to feed back the actual blower speed to the controller, so that the actual blower speed can be reliably controlled between 0% and 100%.

For the preferred embodiment, a computation of the average airflow command is based upon the present average airflow, the actual cooking temperature (typically sampled at 10-15 second intervals, with a plurality of other sample rates allowable), and the desired cooking temperature or set point.

Figure 12:
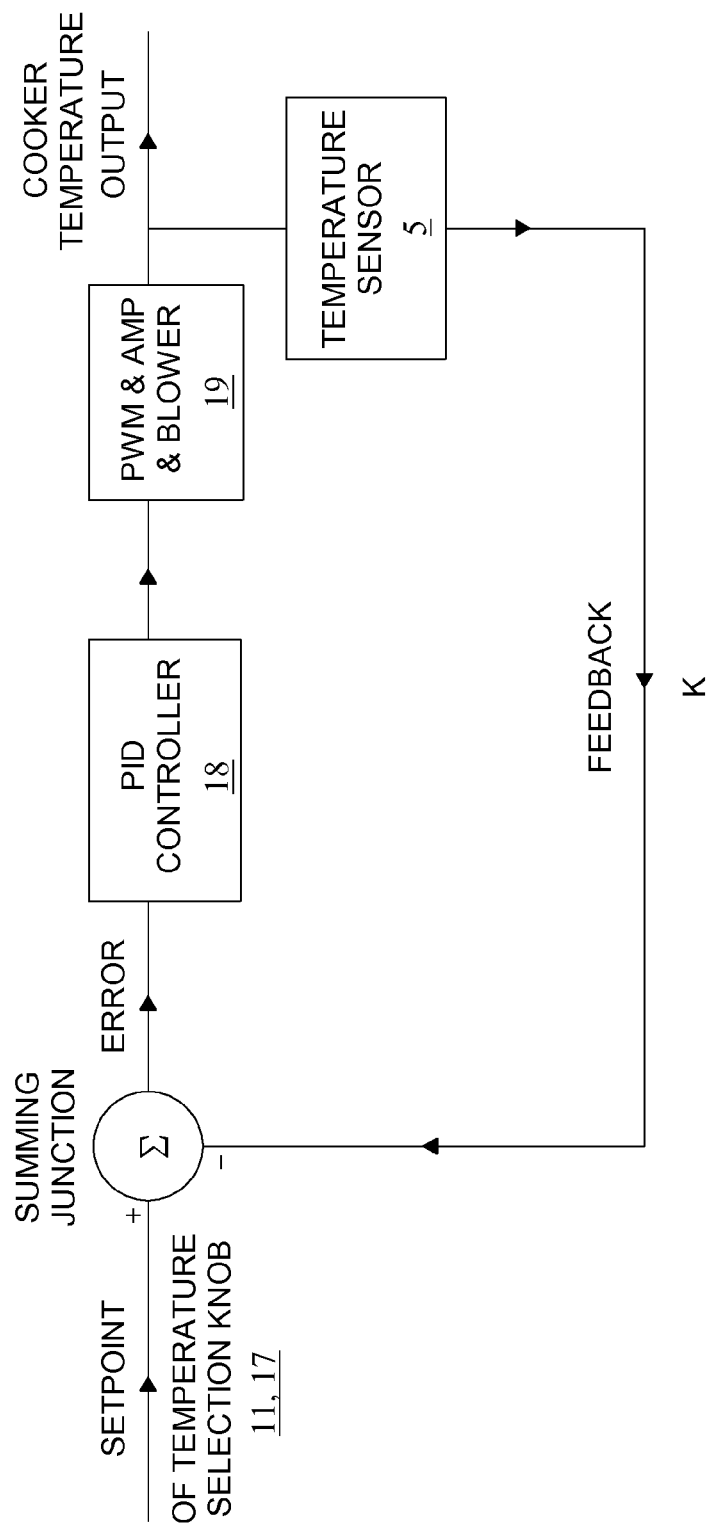
FIG. 12 shows a control loop block diagram for the electronic controller of an automatic temperature control device for solid fuel fired food cooker.

By way of example, if the actual cooking temperature is below that desired, then the commanded average airflow would be increased. In order to compute the airflow command, a modified proportional integral derivative (PID) control (as understood within the arts) is utilized with adaptive PID gain adjustments. The PID gains are adapted according to the speed of the cooker's response to airflow changes. By way of example, a smaller cooker 21 will have less thermal mass and will respond more quickly to airflow changes than will a larger cooker 21 with increased thermal mass. By modifying the PID gains (i.e. multiplier constants before the error term, integrated error term, and differentiated error term; the error term being the difference between the temperature selection knob 11 setpoint and the cooking temperature sensor 5 temperature), the control algorithm matches its reaction time to match that of the cooker 21, minimizing undershoots, overshoots, and conserves the amount of solid fuel utilized. By way of example, when the cooker's response time is above a threshold, then the PID gains are modified or increased to speed up the PID's response time to match the cooker. The PID controller is seen in the block diagram control system FIG. 12 drawing and represents three parallel paths there through which represent a linear path, an integrated path, and a differentiated path respectively which sum at the output and feed the PWM control of the PID electronic controller 18.

For the preferred embodiment, a novel approach is employed to increase control loop robustness and to hasten the time the control algorithm settles in on the desired cooking temperature. A modified take-back-half (TBH) algorithm is used to modify the PID integrator variable. In operation, when the actual cooking temperature variable (i.e temperature equivalent) crosses through the desired cooking temperature, the integrator's memory variable is reset to the mathematical average of its present value and the previous value during the last time the actual temperature passed through the set point. That is, if the present value of the integrator output when the cooking temperature sensor reaches the setpoint on the temperature selection knob is represented by $IV_{present}$ and the prior stored value of the integrator output when the cooking temperature sensor previously reached the setpoint on the temperature selection knob (i.e. the last time) is represented by $IV_{prior}$ and the reset value of the integrator's memory variable is $IV_{reset}$, the running output value of the PID integrator is reset to (i.e. current value replaced in memory) the value of:

$$IV_{reset} = \frac{IV_{present} + IV_{prior}}{2}$$

The technique is used to ensure control loop convergence on the desired cooking temperature, even in the presence of marginal stability situations and further conserves or minimizes solid fuel usage. The aforesaid TBH-PID is used to compute an airflow command utilized by the electronic controller 18. In practice, the airflow command is typically limited to be between 0% and 100%.

For the preferred embodiment, upon computation of the desired airflow command, the electronic controller 18 converts the airflow command to the required BSC/BTP values. That is, once the control algorithm has computed the airflow command using the TBH-PID, it must be converted to actual BSC PWM values and BTP time-on values so that the average airflow from the blower can be adjusted to match that desired by the control algorithm. For the preferred embodiment, a look up table (LUT) is employed with alternative embodiments utilizing a plurality of conversion techniques including but not limited to a fixed constant, linear or nonlinear equation computations, or state variables. For enablement purposes only and by no means a limitation of the preferred embodiment LUT, the below table represents a LUT utilized for the present art.

| Airflow Command | BSC | BTP |
| --- | --- | --- |
| 0% | 50% | 0 s |
| 10% | 50% | 4 s |
| 20% | 50% | 8 s |
| 30% | 50% | 12 s |
| 40% | 50% | 16 s |
| 50% | 50% | 20 s |
| 60% | 60% | 20 s |
| 70% | 70% | 20 s |
| 80% | 80% | 20 s |
| 90% | 90% | 20 s |
| 100% | 100% | 20 s |

For the preceding LUT, the airflow command is computed by the TBH-PID and is used to index the BSC and BTP values. The BSC value represents the average potential or voltage presented to the blower 19 power terminals, and the BTP represents the time the blower 19 is turned on within the afore described 20 second window. As understood within the arts, for both BSC and BTP, the average potential or voltage presented to the blower is construed, or effectively controlled or modified, as being an integral of potential value over shorter or longer periods of time. For a four terminal blower 19 having on-board electronics, the blower 19 on-board electronics linearize the airflow generated to the average voltage at its power terminals, but in other embodiments, the LUT can include or capture the desired linearization in order to implement a full BSC 0% to 100% control.

An alternative embodiment of the present art utilizes an automatic damper 22 control for optimal control of convection currents. In addition to the afore described control techniques, it is further possible to enhance control and temperature regulation with an automatic damper 22. During the blower 19 off period in the BTP control mode, there exists a natural convection current that flows upwards in the cooker 21 causing a draft to flow into the blower box 2 and through the grate 3, air tube 7, and air manifold 9 and eventually into the cooker 21 acting as combustion air and feeding the solid fuel fire. This effect is undesirable and can be controlled with the damper 22.

Figure 6:
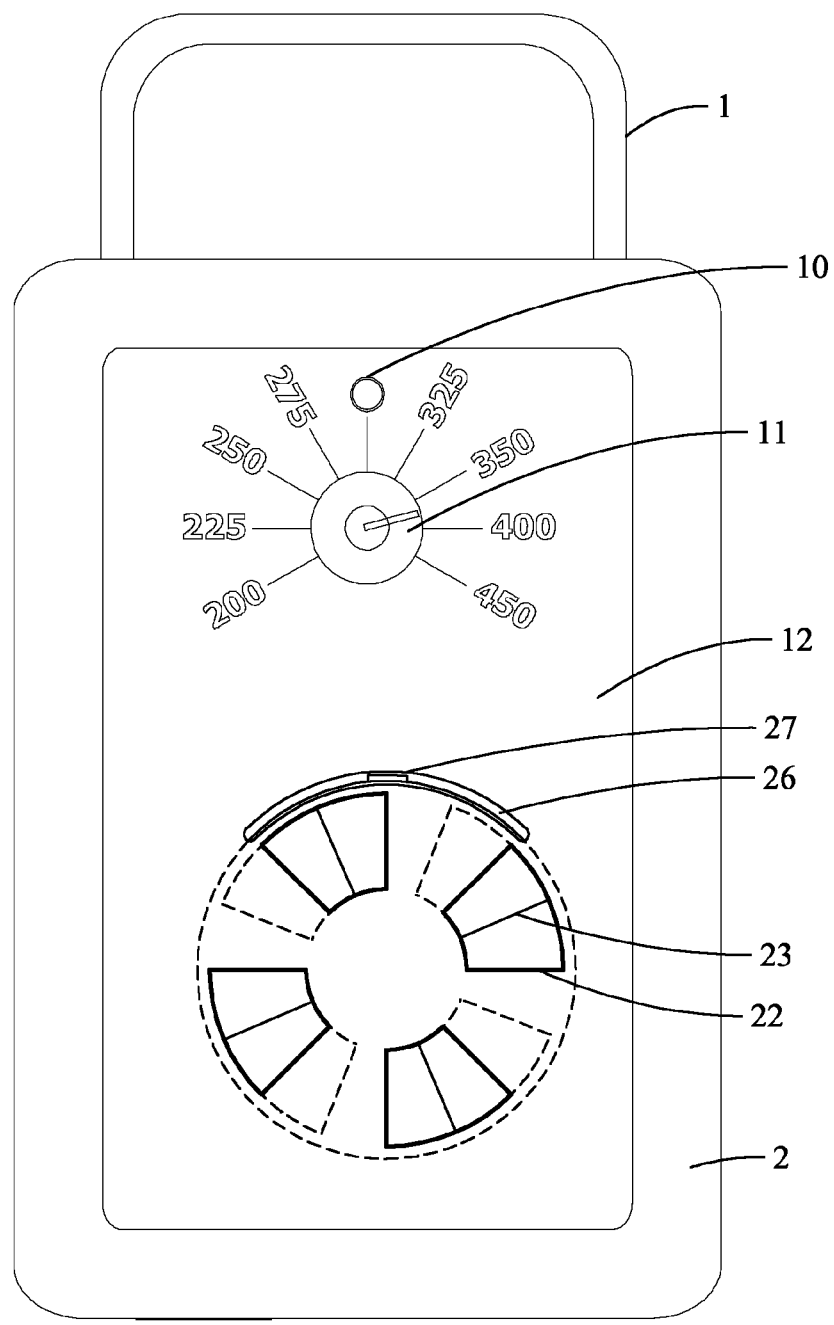
FIG. 6 shows a front plan view of an automatic temperature control device for solid fuel fired food cooker having a manual damper in a fully open position.
Figure 7:
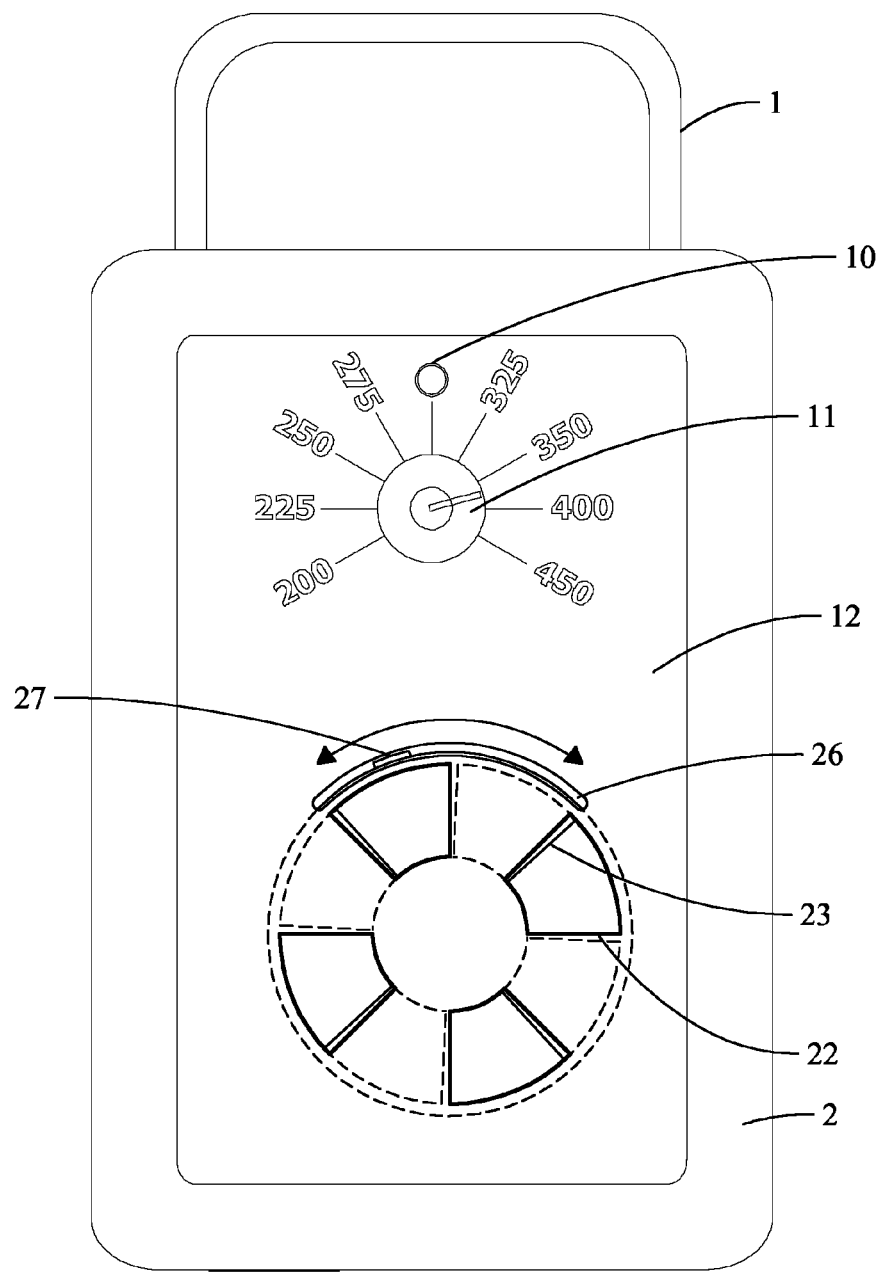
FIG. 7 shows a front plan view of an automatic temperature control device for solid fuel fired food cooker having a manual damper in a partially open position.
Figure 8:
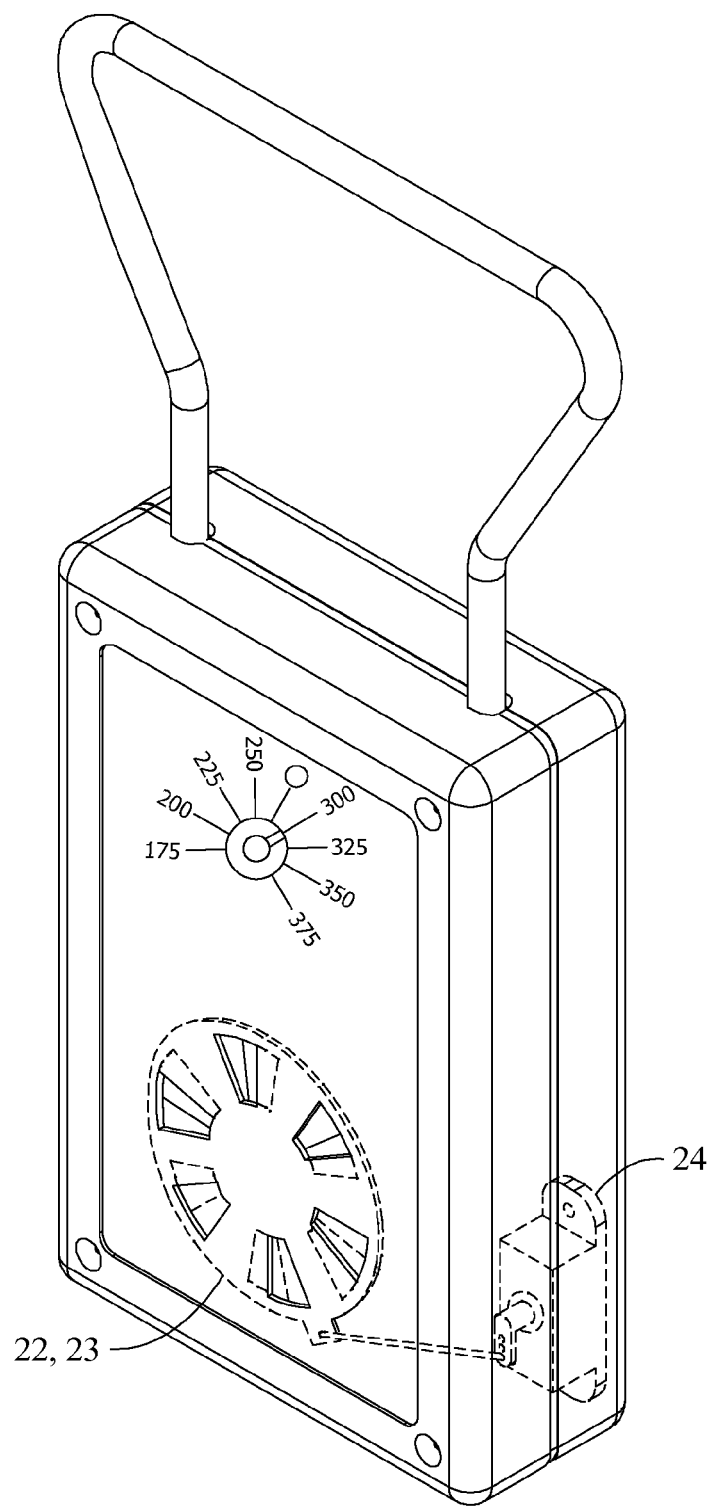
FIG. 8 shows a front perspective view of an automatic temperature control device for solid fuel fired food cooker having an automatic damper in a partially open position.
Figure 9:
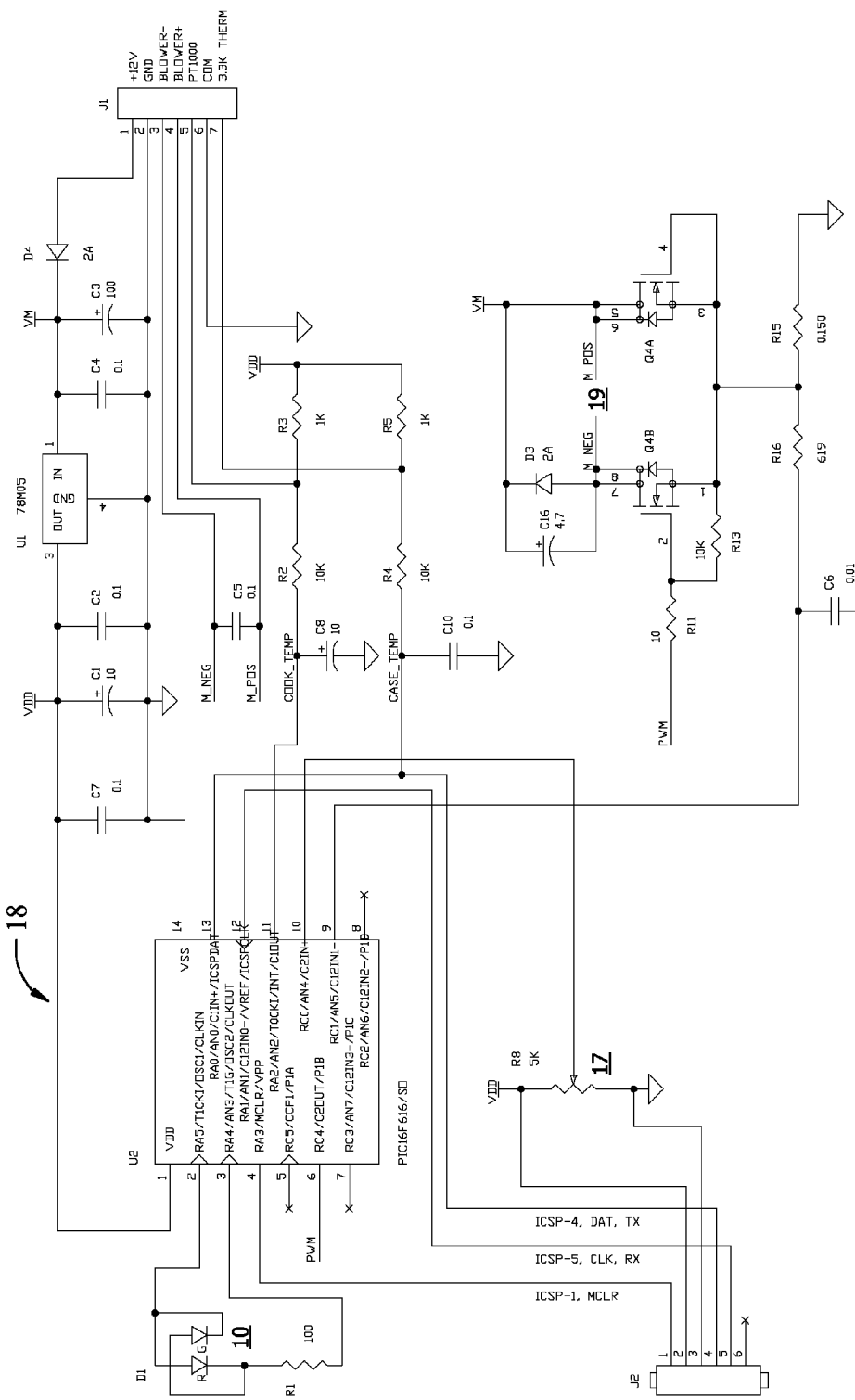
FIG. 9 shows a schematic circuit diagram for the electronic controller of an automatic temperature control device for solid fuel fired food cooker showing a first embodiment for use with a two terminal air blower.
Figure 10:
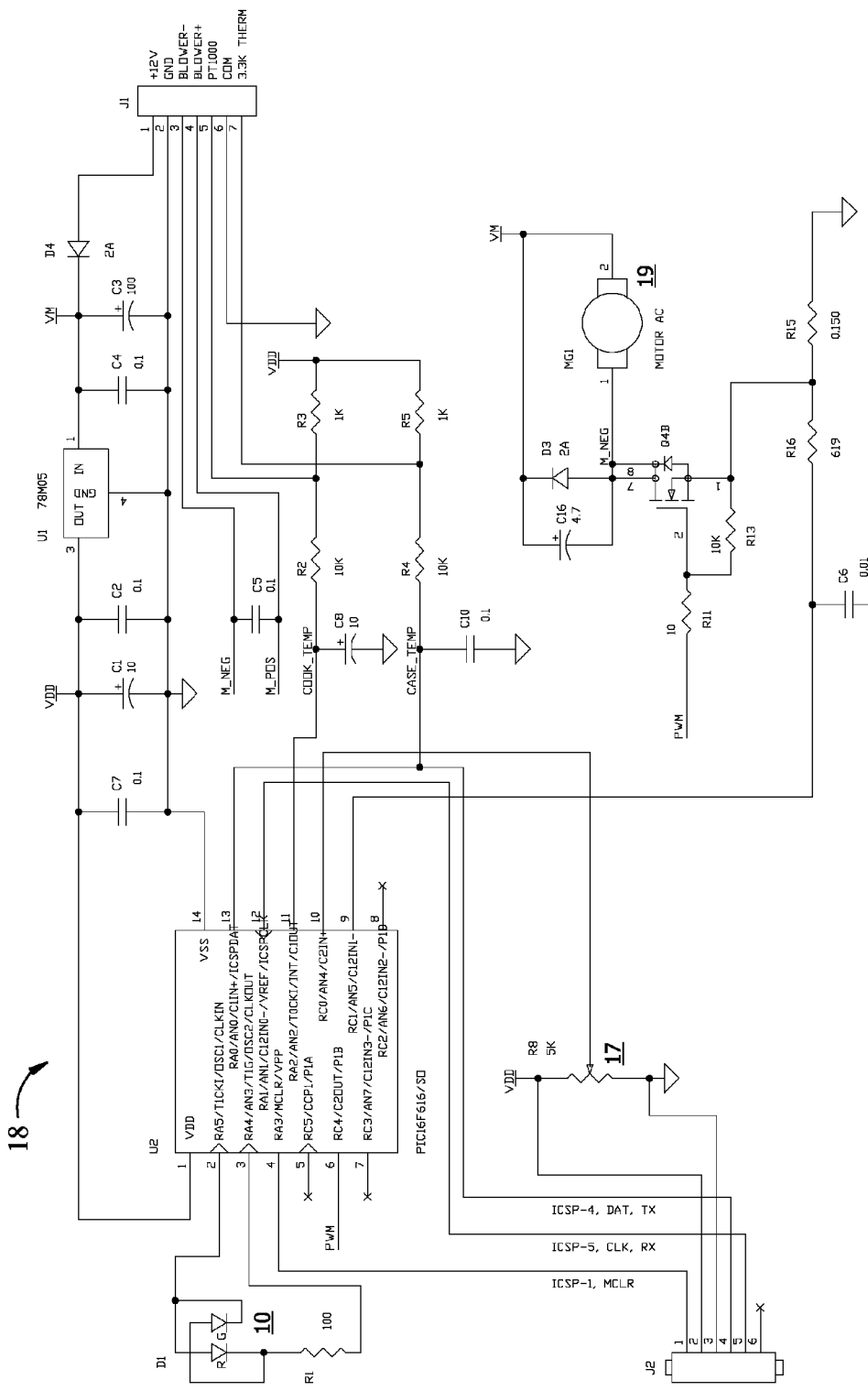
FIG. 10 shows a schematic circuit diagram for the electronic controller of an automatic temperature control device for solid fuel fired food cooker showing a second embodiment for use with a two terminal air blower.
Figure 11:
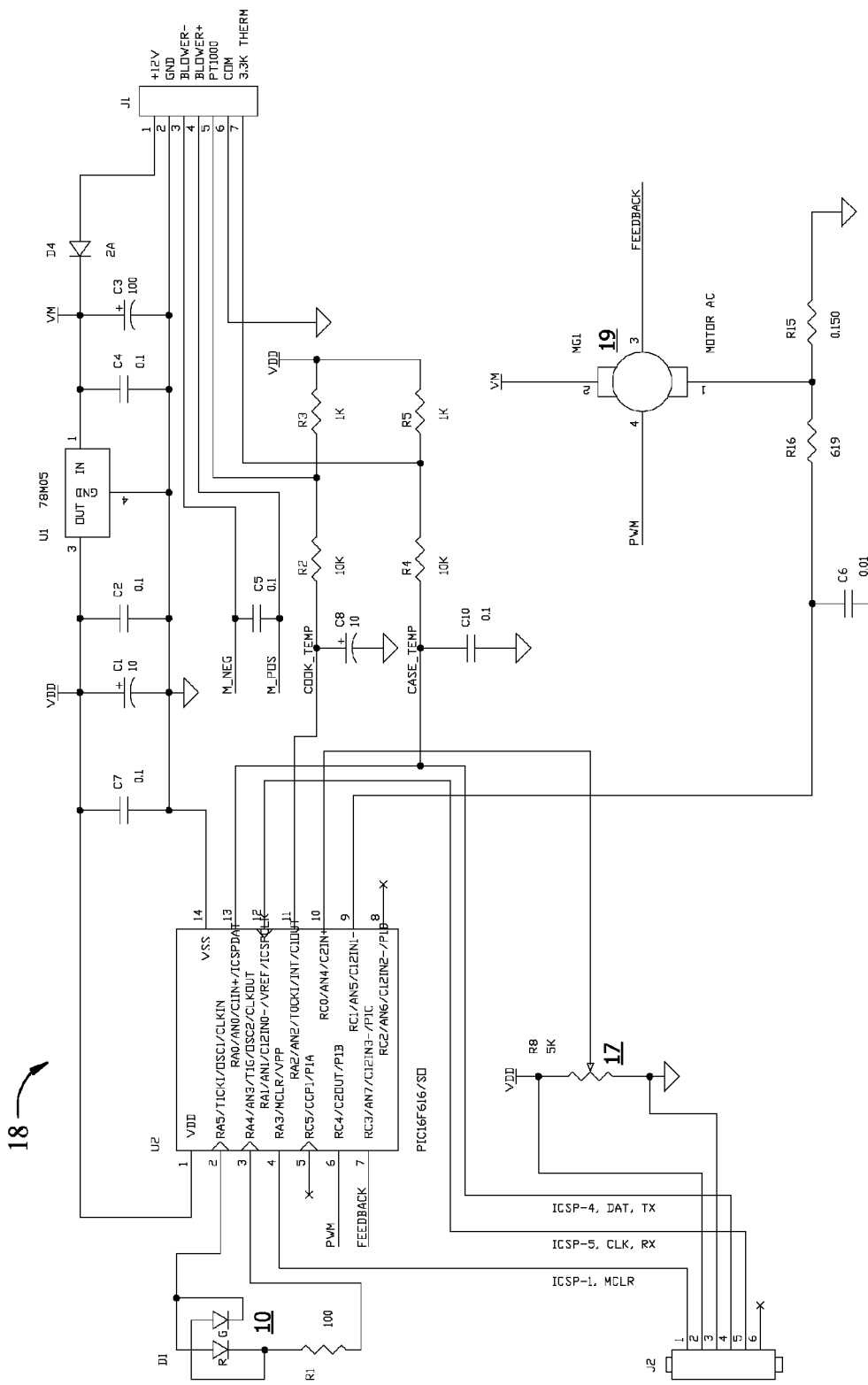
FIG. 11 shows a schematic circuit diagram for the electronic controller of an automatic temperature control device for solid fuel fired food cooker showing a first embodiment for use with a four terminal air blower.

For this alternative embodiment, the damper 22 is preferably a rotary vane 23 type that blocks a portion or percentage of the blower 19 air intake grate 3, thereby allowing unrestricted airflow, complete blocking of airflow, or a flow in between the aforesaid. Alternative embodiments may utilize a plurality of damper 22 configurations, including but not limited to iris types, shutter types, or register types and may further utilize a restriction or damper at the output of the air blower 19 or within the air tube 7 or at the air manifold 9. For the alternative embodiment described, the electronic controller 18 utilizes the computed airflow command to position the automatic damper 22 to an appropriate position in order to keep the convection current at a manageable level. That is, if the blower 19 is off and the electronic controller 18 senses that the cooker 21 temperature is rising, i.e. via natural convection, it will close the damper 22 to a partially or eventually fully closed position. The controller 18 preferably positions the damper 22 using an attached electromechanical damper servo 24 such as found on radio controlled hobby cars and planes. The damper servo 24 is electrically connected with the electronic controller 18 and controlled thereby. Alternative embodiments may utilize servos 24 or damper 22 controls which take a plurality of forms, including but not limited to motors, linear motors, geared motors, electro-mechanical linear actuators, pneumatic actuators, or hydraulic actuators. By way of example only, when the airflow command is 50%, the automatic damper 22 would be set to 25% open in order to reduce convection currents during the blower 19 off time. The manual damper 22 shown in FIGS. 6 & 7 requires user closure to achieve the same results. That is, if the status LED 10 is solid or flashing red and the blower 19 is off, the user may close the damper 22 to minimize convection feed of the solid fuel. For this embodiment a tab 27 is attached with the rotary vane 23 and extends through a slot 26 in the face or front of the blower box 2 and the graphic overlay 12. The user simply moves the tab 27 within the slot 26 in order to open or close the damper 22.

Although described for enablement purposes, the electronic component part numbers or values, lengths, widths, geometric shapes, gains, constants, and other dimensional or parameter attributes may depart significantly from those specified. The shape, size, location, component numbers, mounting methods, and LUT values utilized for the components described may take a plurality of forms as recognized within the pertinent arts without departing from the scope and spirit of the present invention.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. An automatic temperature control device for solid fuel fired food cooker, comprising:
    a blower box having an inside and an outside and a single variable speed air blower within said inside as an integrated unit; and
    said blower box having a discharge port connected with a first end of a substantially flexible air tube; and
    a second end of said air tube connected to an air manifold; and
    said air manifold attachable to and detachable from a cooker having a solid fuel at any point on the cooker designed for an ingestion of a combustion air; and
    said air blower capable of ingesting an atmospheric air from said outside of said blower box and directing the atmospheric air to said discharge port and through said air tube and air manifold and into the cooker; and
    an electronic controller within said inside of said blower box and connected with said air blower; and
    a cooking temperature sensor placable within the cooker and having a first end of a sensor cable attached therewith and a second end of said sensor cable attached with said electronic controller; and
    one or more blower speed control or blower time proportioning algorithms embedded within said electronic controller which is capable of varying an airflow of said air blower and substantially adaptively sensing and learning the thermal parameters of the cooker and adjusting the airflow of a combustion to match a thermal reaction time of the cooker and meet a temperature setpoint and thereby varying the atmospheric air directed into the cooker and at the solid fuel in response to a temperature signal from said cooking temperature sensor within the cooker and meet said temperature setpoint within the cooker whereby said electronic controller in conjunction with said single air blower is capable of automatically adapting and controlling a temperature within substantially any size cooker; and
    an adjustable damper over said air blower where said air blower is capable of ingesting an atmospheric air; and
    said damper capable of allowing or restricting airflow caused by convection currents whether said air blower is operating or not; and
    a hanger connected with said blower box whereby said blower box may be hung with an extending element of the cooker; and
    said cooking temperature sensor having a retaining clip capable of attaching with an internal portion of the cooker and said retaining clip capable of retaining said cooking temperature sensor in the vicinity of a food to be cooked; and
    said substantially flexible air tube having one or more corrugations.

2. The automatic temperature control device for solid fuel fired food cooker as set forth in claim 1, further comprising:
    a status indicator light attached with said blower box; and
    said status indicator light having a flashing green color if said temperature within said cooker is below said temperature setpoint; and
    said status indicator light having a solid green color if said temperature within said cooker is close to said temperature setpoint; and
    said status indicator light having a red color if said temperature within said cooker is above said temperature setpoint.

3. The automatic temperature control device for solid fuel fired food cooker as set forth in claim 2, further comprising:
    a rotary control temperature selection knob attached with said blower box; and
    said knob allowing a setting of said temperature setpoint.

4. An automatic temperature control device for solid fuel fired food cooker comprising:
    a blower box having an inside and an outside and a single variable speed air blower within said inside as an integrated unit; and
    said blower box having a discharge port connected with a first end of a substantially flexible air tube; and
    a second end of said air tube connected to an air manifold; and
    said air manifold attachable to and detachable from a cooker having a solid fuel at any point on the cooker designed for an ingestion of a combustion air; and
    said air blower capable of ingesting an atmospheric air from said outside of said blower box and directing the atmospheric air to said discharge port and through said air tube and air manifold and into the cooker; and
    an electronic controller within said inside of said blower box and connected with said air blower; and
    a cooking temperature sensor placable within the cooker and having a first end of a sensor cable attached therewith and a second end of said sensor cable attached with said electronic controller; and
    one or more blower speed control or blower time proportioning algorithms embedded within said electronic controller which is capable of varying an airflow of said air blower and substantially adaptively sensing and learning the thermal parameters of the cooker and adjusting the airflow of a combustion to match a thermal reaction time of the cooker and meet a temperature setpoint and thereby varying the atmospheric air directed into the cooker and at the solid fuel in response to a temperature signal from said cooking temperature sensor within the cooker and meet said temperature setpoint within the cooker whereby said electronic controller in conjunction with said single air blower is capable of automatically adapting and controlling a temperature within substantially any size cooker; and said air manifold comprises a folding toggle nut capable of placement through an existing air intake hole on the cooker and unfolding within the cooker; and a wing bolt through at least a portion of said air manifold and threaded with said toggle nut and capable of holding said air manifold against the cooker; and a hose barb mounted with said air manifold and capable of retaining said second end of said air tube; and said manifold having manifold edges that are held tightly and securely against the cooker via said wing bolt and toggle nut.

5. The automatic temperature control device for solid fuel fired food cooker as set forth in claim 1, whereby:

said damper has a rotary vane configuration and a damper servo attached; and said damper servo connected with said electronic controller and capable of partially or fully opening or closing said damper in response to a signal from said electronic controller.

6. The automatic temperature control device for solid fuel fired food cooker as set forth in claim 1, said electronic controller further comprising:

said blower speed control algorithm capable of continuously varying a speed of said air blower and thereby varying said airflow; and said blower time proportioning algorithm which, during a period of low air demand, operates said air blower for a period within a fixed time window and turns off said air blower during a remaining period of said fixed time window.

7. The automatic temperature control device for solid fuel fired food cooker as set forth in claim 1, said electronic controller further comprising:

a modified take back half proportional integral derivative algorithm which senses said temperature signal and creates a cooking temperature variable and when said cooking temperature variable crosses through a desired cooking temperature according to said temperature setpoint, an integrator memory variable is reset to the mathematical average of a present value and a previous value during a last time said cooking temperature variable passed through said desired cooking temperature whereby a control loop convergence on said desired cooking temperature occurs.

8. An automatic temperature control device for solid fuel fired food cooker comprising:

a blower box having an inside and an outside and a single variable speed air blower within said inside as an integrated unit; and said blower box having a discharge port connected with a first end of a substantially flexible air tube; and a second end of said air tube connected to an air manifold; and said air manifold attachable to and detachable from a cooker having a solid fuel at any point on the cooker designed for an ingestion of a combustion air; and said air blower capable of ingesting an atmospheric air from said outside of said blower box and directing the atmospheric air to said discharge port and through said air tube and air manifold and into the cooker; and an electronic controller within said inside of said blower box and connected with said air blower; and a cooking temperature sensor placable within the cooker and having a first end of a sensor cable attached therewith and a second end of said sensor cable attached with said electronic controller; and one or more blower speed control or blower time proportioning algorithms embedded within said electronic controller which is capable of varying an airflow of said air blower and substantially adaptively sensing and learning the thermal parameters of the cooker and adjusting the airflow of a combustion to match a thermal reaction time of the cooker and meet a temperature setpoint and thereby varying the atmospheric air directed into the cooker and at the solid fuel in response to a temperature signal from said cooking temperature sensor within the cooker and meet said temperature setpoint within the cooker whereby said electronic controller in conjunction with said single air blower is capable of automatically adapting and controlling a temperature within substantially any size cooker; and a modified proportional integral derivative algorithm which monitors a cookers response time, adaptively adjusts one or more gains of said proportional integral derivative algorithm to match a reaction time of said cooker thereby when said response time of said cooker is above a threshold said gains are increased in order to speed up said proportional integral derivative algorithm response time whereby an undershoot and an overshoot are minimized and the solid fuel is conserved.

9. An automatic temperature control device for solid fuel fired food cooker, comprising:

a blower box having an inside and an outside and a single air blower within said inside as an integrated unit; and said blower box having a discharge port connected with a first end of a substantially flexible air tube; and a second end of said air tube connected to an air manifold; and said air manifold attachable to a cooker having a solid fuel at any point on the cooker designed for an ingestion of a combustion air; and said air blower capable of ingesting an atmospheric air from said outside of said blower box and directing the atmospheric air to said discharge port and through said air tube and air manifold and into the cooker; and an electronic controller within said inside of said blower box and connected with said air blower; and a cooking temperature sensor placable within the cooker having a first end of a sensor cable attached therewith and a second end of said sensor cable attached with said electronic controller; and one or more blower speed control or blower time proportioning algorithms embedded within said electronic controller which is capable of varying an airflow of said air blower and thereby varying the atmospheric air directed into the cooker and at the solid fuel in response to a temperature signal from said cooking temperature sensor within the cooker and meet a temperature setpoint within the cooker whereby said electronic controller in conjunction with said single air blower is capable of automatically adapting and controlling a temperature within substantially any size cooker; and a modified take back half proportional integral derivative algorithm which senses said temperature signal and creates a cooking temperature variable and when said cooking temperature variable crosses through a desired cooking temperature according to said temperature setpoint, an integrator memory variable is reset to the mathematical average of a present value and a previous value during a last time said cooking temperature variable passed through said desired cooking temperature whereby a control loop convergence on said desired cooking temperature occurs; and a lookup table representing one or more values of said blower speed control or said blower time proportioning versus an airflow command of said modified take back half proportional integral derivative algorithm; and said lookup table capable of indexing said airflow command of said modified take back half proportional integral derivative algorithm; and said electronic controller capable of converting said airflow command to said one or more values of said blower speed control or said blower time proportioning thereby an average airflow of said air blower is adjusted by an average potential presented to said air blower.

10. An automatic temperature control device for solid fuel fired food cooker, comprising:

a blower box having an inside and an outside and a single air blower within said inside as an integrated unit; and said blower box having a discharge port connected with a first end of a substantially flexible air tube; and a second end of said air tube connected to an air manifold; and said air manifold attachable to a cooker having a solid fuel at any point on the cooker designed for an ingestion of a combustion air; and said air blower capable of ingesting an atmospheric air from said outside of said blower box and directing the atmospheric air to said discharge port and through said air tube and air manifold and into the cooker; and an electronic controller within said inside of said blower box and connected with said air blower; and a cooking temperature sensor placable within the cooker having a first end of a sensor cable attached therewith and a second end of said sensor cable attached with said electronic controller; and one or more blower speed control or blower time proportioning algorithms embedded within said electronic controller which is capable of varying an airflow of said air blower and thereby varying the atmospheric air directed into the cooker and at the solid fuel in response to a temperature signal from said cooking temperature sensor within the cooker and meet a temperature setpoint within the cooker whereby said electronic controller in conjunction with said single air blower is capable of automatically adapting and controlling a temperature within substantially any size cooker; and a modified proportional integral derivative algorithm which adaptively adjusts one or more gains of said proportional integral derivative algorithm to match a reaction time of said cooker thereby when a response time of said cooker is above a threshold said gains are increased in order to speed up said proportional integral derivative algorithm response time whereby a undershoot and an overshoot are minimized and the solid fuel is conserved; and a lookup table representing one or more values of said blower speed control or said blower time proportioning versus an airflow command of said modified proportional integral derivative algorithm; and said lookup table capable of indexing said airflow command of said modified proportional integral derivative algorithm; and said electronic controller capable of converting said airflow command to said one or more values of said blower speed control or said blower time proportioning thereby an average airflow of said air blower is adjusted by an average potential presented to said air blower.

11. The automatic temperature control device for solid fuel fired food cooker as set forth in claim 8, further comprising:

an adjustable damper over said air blower where said air blower is capable of ingesting an atmospheric air; and said damper capable of allowing or restricting airflow caused by convection currents whether said air blower is operating or not.

12. The automatic temperature control device for solid fuel fired food cooker as set forth in claim 11, whereby:

said damper has a damper servo attached; and said damper servo connected with said electronic controller and capable of opening or closing said damper in response to a signal from said electronic controller.

13. The automatic temperature control device for solid fuel fired food cooker as set forth in claim 7, whereby:

said damper has a damper servo attached; and said damper servo connected with said electronic controller and capable of opening or closing said damper in response to a signal from said electronic controller.

14. The automatic temperature control device for solid fuel fired food cooker as set forth in claim 7, further comprising:

a status indicator light attached with said blower box; and said status indicator light having a flashing green color if said temperature within said cooker is below said temperature setpoint; and said status indicator light having a solid green color if said temperature within said cooker is close to said temperature setpoint; and said status indicator light having a red color if said temperature within said cooker is above said temperature setpoint.

15. The automatic temperature control device for solid fuel fired food cooker as set forth in claim 8, further comprising:

a status indicator light attached with said blower box; and said status indicator light having a flashing green color if said temperature within said cooker is below said temperature setpoint; and said status indicator light having a solid green color if said temperature within said cooker is close to said temperature setpoint; and said status indicator light having a red color if said temperature within said cooker is above said temperature setpoint.

16. The automatic temperature control device for solid fuel fired food cooker as set forth in claim 4, further comprising:

a status indicator light attached with said blower box; and said status indicator light having a flashing green color if said temperature within said cooker is below said temperature setpoint; and said status indicator light having a solid green color if said temperature within said cooker is close to said temperature setpoint; and said status indicator light having a red color if said temperature within said cooker is above said temperature setpoint.

17. The automatic temperature control device for solid fuel fired food cooker as set forth in claim 6, further comprising:
- a status indicator light attached with said blower box; and
- said status indicator light having a flashing green color if said temperature within said cooker is below said temperature setpoint; and
- said status indicator light having a solid green color if said temperature within said cooker is close to said temperature setpoint; and
- said status indicator light having a red color if said temperature within said cooker is above said temperature setpoint.

\* \* \* \* \*